(12) United States Patent
Kim et al.

(10) Patent No.: US 12,272,861 B2
(45) Date of Patent: Apr. 8, 2025

(54) MOVING ROBOT

(71) Applicant: SAMSUNG ELECTRONICS CO., LTD., Suwon-si (KR)

(72) Inventors: Taegyu Kim, Suwon-si (KR); Yeonsik Yu, Suwon-si (KR); Kyounghoon Lee, Suwon-si (KR); Kwangmo Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 17/885,248

(22) Filed: Aug. 10, 2022

(65) Prior Publication Data

US 2023/0112269 A1    Apr. 13, 2023

Related U.S. Application Data

(63) Continuation of application No. PCT/KR2022/011032, filed on Jul. 27, 2022.

(30) Foreign Application Priority Data

Oct. 13, 2021 (KR) .................. 10-2021-0135822
Jan. 10, 2022 (KR) .................. 10-2022-0003244

(51) Int. Cl.
*H01Q 1/22* (2006.01)
*B25J 9/00* (2006.01)
(Continued)

(52) U.S. Cl.
CPC .......... *H01Q 1/2266* (2013.01); *B25J 9/0009* (2013.01); *B25J 13/006* (2013.01); *H01Q 21/29* (2013.01)

(58) Field of Classification Search
CPC .......... H01Q 1/2266; H01Q 1/27; H01Q 1/38; H01Q 21/29; H01Q 21/27; H01Q 21/065; H01Q 21/067; H01Q 5/25
See application file for complete search history.

(56) References Cited

U.S. PATENT DOCUMENTS 10,646,086 B2    5/2020  Ryu et al.
10,871,778 B2 *  12/2020 Xiong ................... G05D 1/028
(Continued)

FOREIGN PATENT DOCUMENTS

JP    2004-268223    9/2004
JP       4158561    10/2008
(Continued)

OTHER PUBLICATIONS

International Search Report dated Nov. 14, 2022 in International Patent Application No. PCT/KR2022/011032 (4 pages; 5 pages English translation).
(Continued)

*Primary Examiner* — Seokjin Kim
(74) *Attorney, Agent, or Firm* — STAAS & HALSEY LLP

(57) ABSTRACT

A moving robot includes a main body; a moving module configured to move the main body; a communication device including an antenna module arranged in a highest portion within the main body and performing wireless communication with an external device; and at least one processor configured to control the moving module based on a signal received from the external device through the communication device so that the main body moves toward the external device, wherein the antenna module includes a substrate; a first antenna arranged on an upper surface of the substrate; and a plurality of second antennas arranged on the upper surface of the substrate to be at the same distance from the first antenna.

14 Claims, 15 Drawing Sheets

(51) Int. Cl.
  *B25J 13/00* (2006.01)
  *H01Q 21/29* (2006.01)

(56) References Cited

U.S. PATENT DOCUMENTS

| | | | |
|---|---|---|---|
| 11,014,621 B2 | 5/2021 | Jeong et al. | |
| 11,169,539 B2 | 11/2021 | Kwak et al. | |
| 2008/0004751 A1 | 1/2008 | Chung et al. | |
| 2010/0188309 A1 | 7/2010 | Orime et al. | |
| 2012/0176275 A1* | 7/2012 | Horisawa | H01Q 9/0471 |
| | | | 343/700 MS |
| 2016/0274580 A1* | 9/2016 | Jung | G05D 1/0033 |
| 2017/0212210 A1* | 7/2017 | Chen | G01S 5/06 |
| 2017/0234961 A1 | 8/2017 | Steltz et al. | |
| 2018/0098676 A1* | 4/2018 | Ryu | A47L 9/2894 |
| 2019/0195981 A1* | 6/2019 | Ding | G01S 5/04 |
| 2019/0268032 A1* | 8/2019 | Stuck | H04B 1/082 |
| 2020/0189107 A1* | 6/2020 | Joo | B25J 9/1697 |
| 2020/0198122 A1* | 6/2020 | Newman | B25J 13/006 |
| 2021/0242599 A1* | 8/2021 | Deng | H01Q 17/001 |
| 2021/0271238 A1* | 9/2021 | Ko | H01Q 1/27 |
| 2021/0331334 A1* | 10/2021 | Kim | B25J 19/02 |
| 2022/0009109 A1* | 1/2022 | Lee | G05D 1/028 |
| 2022/0022719 A1* | 1/2022 | Kwak | G05D 1/695 |
| 2022/0066456 A1* | 3/2022 | Ebrahimi Afrouzi | |
| | | | G06F 3/04883 |
| 2022/0211010 A1* | 7/2022 | Seo | A01K 29/005 |
| 2023/0335888 A1* | 10/2023 | Sudo | H01Q 21/20 |
| 2024/0219921 A1* | 7/2024 | Jung | A47L 9/009 |

FOREIGN PATENT DOCUMENTS

| | | |
|---|---|---|
| KR | 10-2008-0001001 | 1/2008 |
| KR | 5227820 | 7/2013 |
| KR | 10-1750906 | 7/2017 |
| KR | 10-2019-0115502 | 10/2019 |
| KR | 10-2019-0134974 | 12/2019 |
| KR | 10-2020-0015877 | 2/2020 |
| KR | 10-2100476 | 5/2020 |
| KR | 10-2020-0069167 | 6/2020 |
| KR | 10-2021-0030180 | 3/2021 |
| KR | 10-2252033 | 5/2021 |
| KR | 10-2254881 | 5/2021 |
| KR | 10-2021-0087839 | 7/2021 |
| KR | 10-2021-0091176 | 7/2021 |

OTHER PUBLICATIONS

PCT/ISA/237 dated Nov. 14, 2022 in International Patent Application No. PCT/KR2022/011032 (4 pages).
Extended European Search Report dated Nov. 6, 2024 for European Application No. 22881174.1.

* cited by examiner

30: 31, 32, 33, 34

30: 31, 32, 33, 34

⇩ RF ABSORBER IS APPLIED (a)

(b)

(a)

(b)

MOVING ROBOT

CROSS-REFERENCE TO RELATED APPLICATION(S)

This application is a continuation application, under 35 USC § 111(a), of International Application No. PCT/KR2022/011032, filed on Jul. 27, 2022, which claims priority to Korean Patent Application No. 10-2021-0135822, filed on Oct. 13, 2021 and Korean Patent Application No. 10-2022-0003244, filed on Jan. 10, 2022, in the Korean Intellectual Property Office, the disclosure of which is incorporated by reference herein in its entirety.

FIELD

The disclosure relates to a moving robot capable of performing communication with an external device.

DESCRIPTION OF RELATED ART

With the development of robot technologies, robots are widely supplied to ordinary homes as well as specialized academic fields or industrial fields requiring a lot of workforce. Furthermore, not only the robots that perform functions while fixed to a position but also moving robots that is movable are supplied.

The moving robot is a device whose connection to a communication network is essential for transmission of images, sensor data, and the like, coordination with and control of other devices and coordination with a network. Due to the nature of the moving robot based on mobility, the network connection needs to be made not through cable but through wireless communication. Hence, it is necessary to apply an antenna for wireless signal transmission and reception to the moving robot.

The antenna undergoes an unintended change in characteristics of the antenna or degradation of emission performance when there is another metal object or a material with high loss tangent characteristics arranged on the periphery because of radio signal emission characteristics of the antenna.

As for a traditional moving robot, it is common to use a directional antenna or arrange an antenna to be directed to a moving direction, causing distortion depending on intensity or phase difference of radio waves in receiving reflected waves.

SUMMARY

According to an embodiment, a moving robot includes a main body; a moving assembly configured to move the main body; a communication device configured to perform wireless communication with an external device, the communication device including an antenna assembly arranged at an uppermost portion of an interior of the main body; and at least one processor configured to control the moving assembly based on a signal received from the external device through the communication device so that the main body moves, wherein the antenna assembly includes a substrate; a first antenna arranged on an upper surface of the substrate; and a plurality of second antennas arranged on the upper surface of the substrate, and each of the plurality of second antennas arranged at a same distance away from the first antenna.

The moving robot includes an outer case forming an exterior of the main body; and an inner case positioned at an interior of the outer case, and the antenna assembly is arranged between the inner case and the outer case.

The substrate is positioned along a plane orthogonal to a vertical axis of the main body.

The first antenna and the plurality of second antennas are positioned between the outer case and the substrate and separated from outside of the main body only by the outer case with respect to the plane orthogonal to the vertical axis of the main body.

The communication device may include an ultra-wide-band (UWB) communication module located at an interior of the inner case and arranged under the antenna assembly; and a connector arranged between the antenna assembly and the UWB communication module, the connector electrically connecting the antenna assembly and the UWB communication module.

The moving robot may further include an RF absorber configured to absorb RF signals, the radio frequency absorber arranged between the antenna assembly and the UWB communication module.

The RF absorber arranged at the interior of the inner case.

The RF absorber may be formed to have an area wider than the substrate of the antenna assembly.

The moving robot may further include a metal plate located under the UWB communication module to divide an inner space of the main body formed by the inner case to spatially separate the communication device from the at least one processor, and blocking the passage of RF signals.

The moving assembly and the at least one processor may be arranged under the metal plate.

A distance between the first antenna and the second antenna may be equal to or less than a half of a wavelength corresponding to a highest frequency for UWB communication.

The first antenna and the plurality of second antennas may be isotropic antennas.

An array of the first antenna and the plurality of second antennas are arranged in the middle of a cross-section of the moving robot.

The plurality of second antennas may be arranged such that a center axis of the second antenna forms a preset angle with a center axis of the first antenna.

The first antenna and the plurality of second antennas are attached to the substrate along a horizontal axis or vertical axis.

The at least one processor may determine a distance to the external device based on a difference in time between when the external device transmits a signal and when the first antenna receives the signal transmitted from the external device.

The at least one processor may determine an angle with the external device based on a difference in phase between a signal received through the first antenna and signals received through the plurality of second antennas and a position of the array of the first antenna and the plurality of second antennas.

The at least one processor may determine an angle with the external device based on a difference in phase between signals received through the first antenna and one of the plurality of second antennas, a difference in phase between signals received through the first antenna and another one of the plurality of second antennas and a position of the array of the first antenna and the plurality of second antennas.

The at least one processor may control the moving module for the main body to move toward the external device based on the distance to the external device and the angle with the external device.

According to an embodiment, a moving robot includes a main body provided in a spherical shape; a moving module configured to move the main body; a communication device including an antenna module arranged in an uppermost portion within the main body and performing ultra-wideband (UWB) communication; and at least one processor configured to control the moving module based on a signal received from the external device through the communication device so that the main body moves toward the external device, wherein the antenna module includes a substrate provided as a plane orthogonal to a vertical axis of the main body; a first antenna arranged on an upper surface of the substrate and transmitting or receiving signals; a second antenna arranged on the upper surface of the substrate to be at a preset distance from the first antenna, and receiving a signal; and a third antenna arranged on the upper surface of the substrate to be at the same distance as the preset distance from the first antenna, and receiving a signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
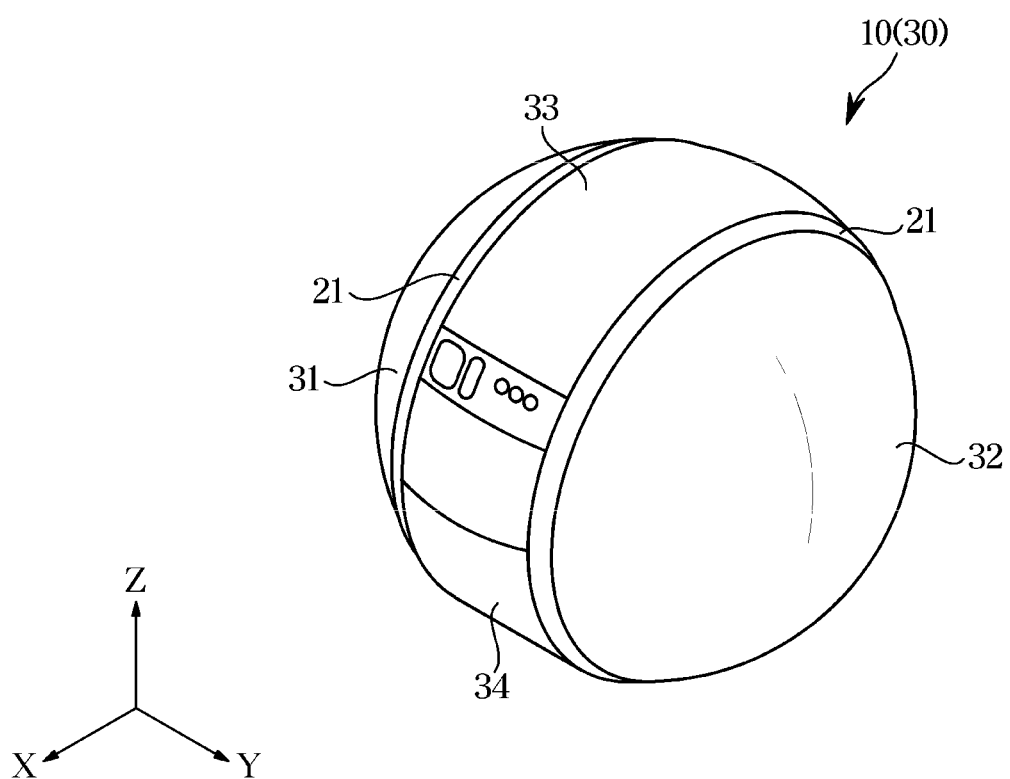
FIG. 1 is an exterior view of a moving robot, according to an embodiment.

Embodiments and features as described and illustrated in the disclosure are merely examples, and there may be various modifications replacing the embodiments and drawings at the time of filing this application.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Furthermore, the terms, such as "~part", "~block", "~member", "~module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

The terms 'front', 'rear', 'top', 'bottom', 'side', 'left', 'right', 'upper', 'lower', etc., as herein used are defined with respect to the drawings, but the terms may not restrict the shape and position of the respective components.

In this specification, components required for describing each embodiment are described, without being limited thereto. Some components may be changed or omitted, and other components may be added. Furthermore, the components may be distributed to different devices.

Although embodiments of the disclosure are described by referring to accompanying drawings and contents written on the drawings, the disclosure is not limited to the embodiments.

The disclosure provides a moving robot having a main body with an antenna arranged on the uppermost portion within the main body to be able to receive radio frequency (RF) signals from all directions and minimize distortion and interference of radio waves in all directions.

According to an embodiment, a moving robot may have a main body with an antenna arranged in an uppermost portion within the main body to be able to receive radio frequency (RF) signals from all directions and minimize distortion and interference of radio waves in all directions.

Reference will now be made in detail to embodiments of the disclosure, which are illustrated in the accompanying drawings.

FIG. 1 is an exterior view of a moving robot, according to an embodiment.

Referring to FIG. 1, the moving robot 1 is a device that performs various functions such as recognizing surrounding environments, enabling autonomous driving and information gathering, delivering information to the user, etc.

The moving robot 1 may recognize surrounding environments based on recognition of voice, sound and images. The moving robot 1 may also perform communication with an external device through wireless communication, and identify the location of the external device or control the external device.

The moving robot 1 includes a moving module, allowing itself to be able to physically move around to perform various functions of the moving robot 1 across the surroundings of the user including interior and exterior.

For example, the moving robot 1 may identify the location of an external device and move toward the external device. When the external device corresponds to a wearable device that may be worn by a pet, the moving robot 1 may identify the location of the pet by identifying the location of the wearable device, move toward the pet to take care of the pet or collect information about the pet and provide the information to the user.

Furthermore, the moving robot 1 may perform functions and collect information by interacting with home appliances placed in the house such as a television, a washing machine, etc., and deliver the collected information to members of the family including a pet. Hence, the moving robot 1 may connect between all family members and the home appliances.

The moving robot 1 may also keep confirming and checking environments in the house even while the user is absent, and connect the user with a family member including the pet in need of help. Furthermore, the moving robot 1 may physically move around to check and operate other home appliances in the house. Accordingly, the moving robot 1 may facilitate safety and tighten security in the house.

In an embodiment, the moving robot 1 may be implemented in a form that performs a task in the house but is not limited thereto, and may be implemented in other various robot devices.

In an embodiment, the moving robot 1 may include an outer case 30 that forms an exterior of a main body 10. In other words, the exterior of the main body 10 of the moving robot 1 may be defined by the outer case 30.

For example, as shown in FIG. 1, the outer case 30 may include first and second side cases 31 and 32 that form the sides of the main body 10, an upper case 33 covering upper portions of the main body 10, and a lower case 34 covering lower portions of the main body 10.

In this case, the first side case 31, the second side case 32, the upper case 33 and the lower case 34 may have the same curvature, so that the main body 10 of the moving robot 1 may have a spherical shape.

The exterior of the moving robot 1 is not, however, limited to the example, and may have other various shapes. Furthermore, the outer case 30 that defines the exterior of the main body 10 is not limited to the example either, but may be formed in one unit.

The moving robot 1 may include wheels 21 that move the main body 10. The moving robot 1 may move itself by controlling rotation speed and rotation direction of each of the pair of wheels 21.

Furthermore, the main body 10 of the moving robot 1 may be equipped with various sensors (not shown) for sensing surroundings. For example, the main body 10 of the moving robot 1 may include at least one of a camera for capturing an image in a forward direction, a sensor for identifying a surrounding object (e.g., an infrared sensor, a lidar sensor, a radar sensor, or the like) or a microphone for identifying a surrounding voice.

Figure 2:
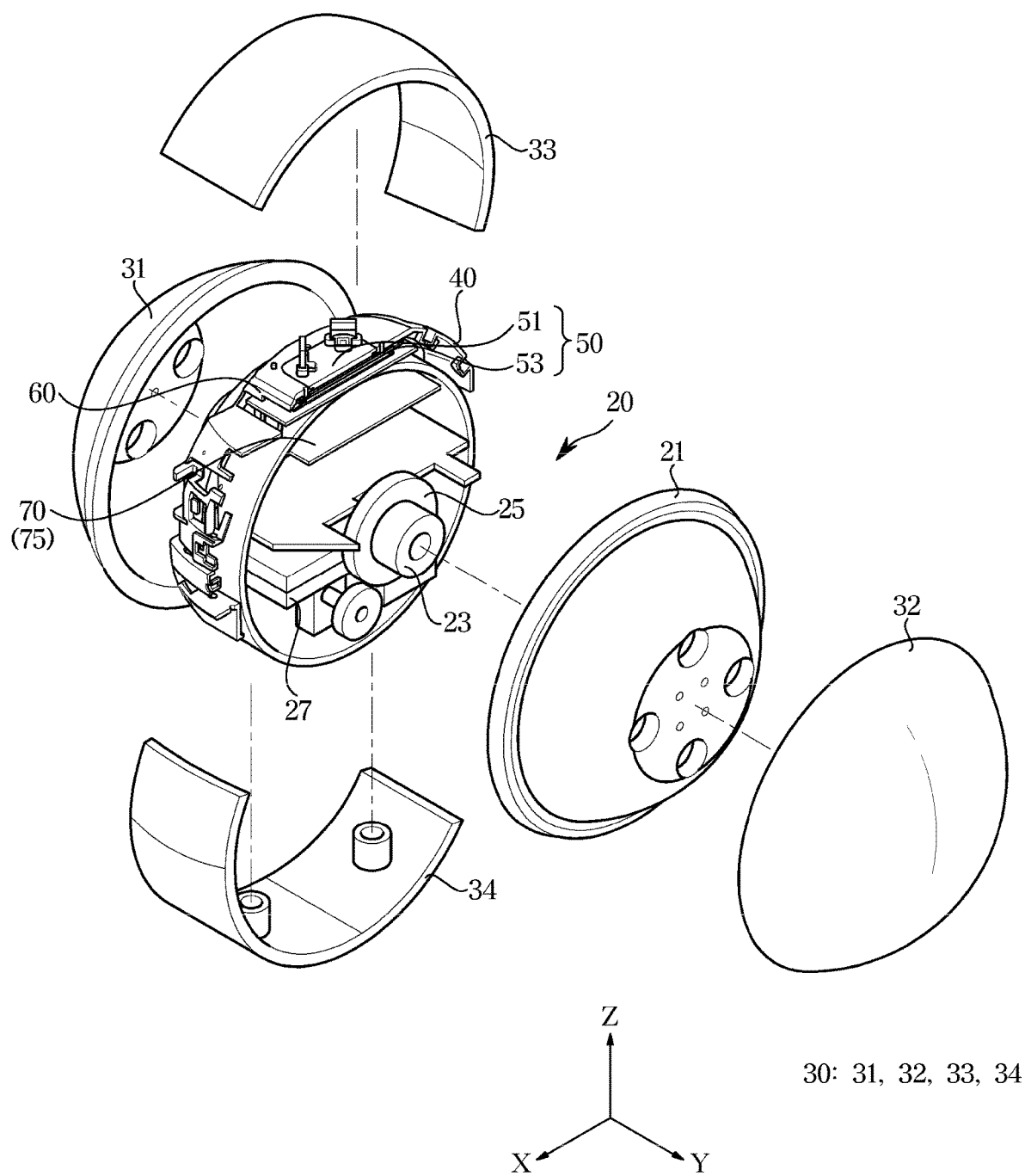
FIG. 2 is an exploded perspective view of a moving robot, according to an embodiment.
Figure 3:
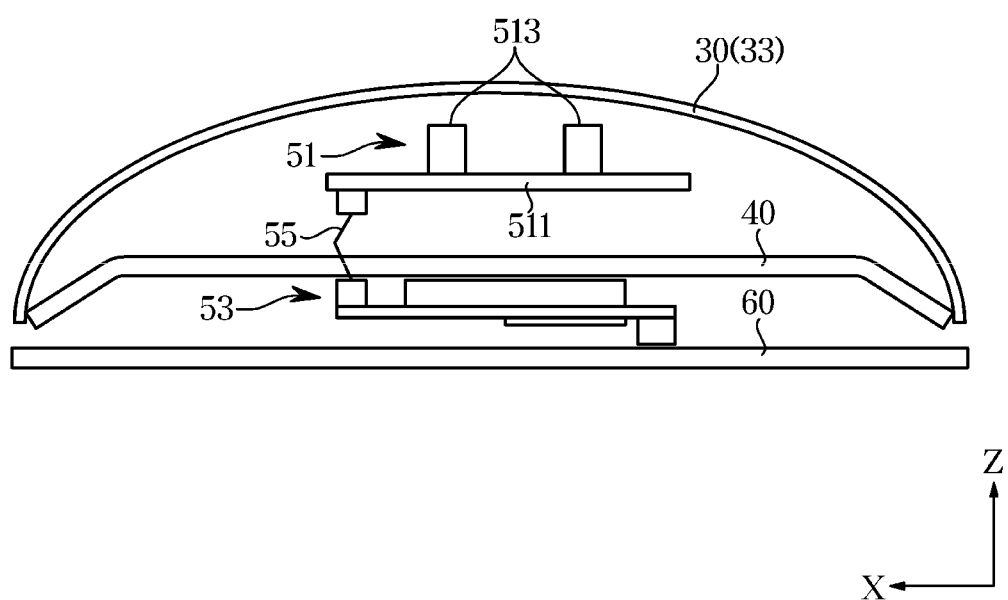
FIG. 3 is a schematic diagram of a side of a moving robot for describing a position of an antenna module, according to an embodiment.
Figure 4:
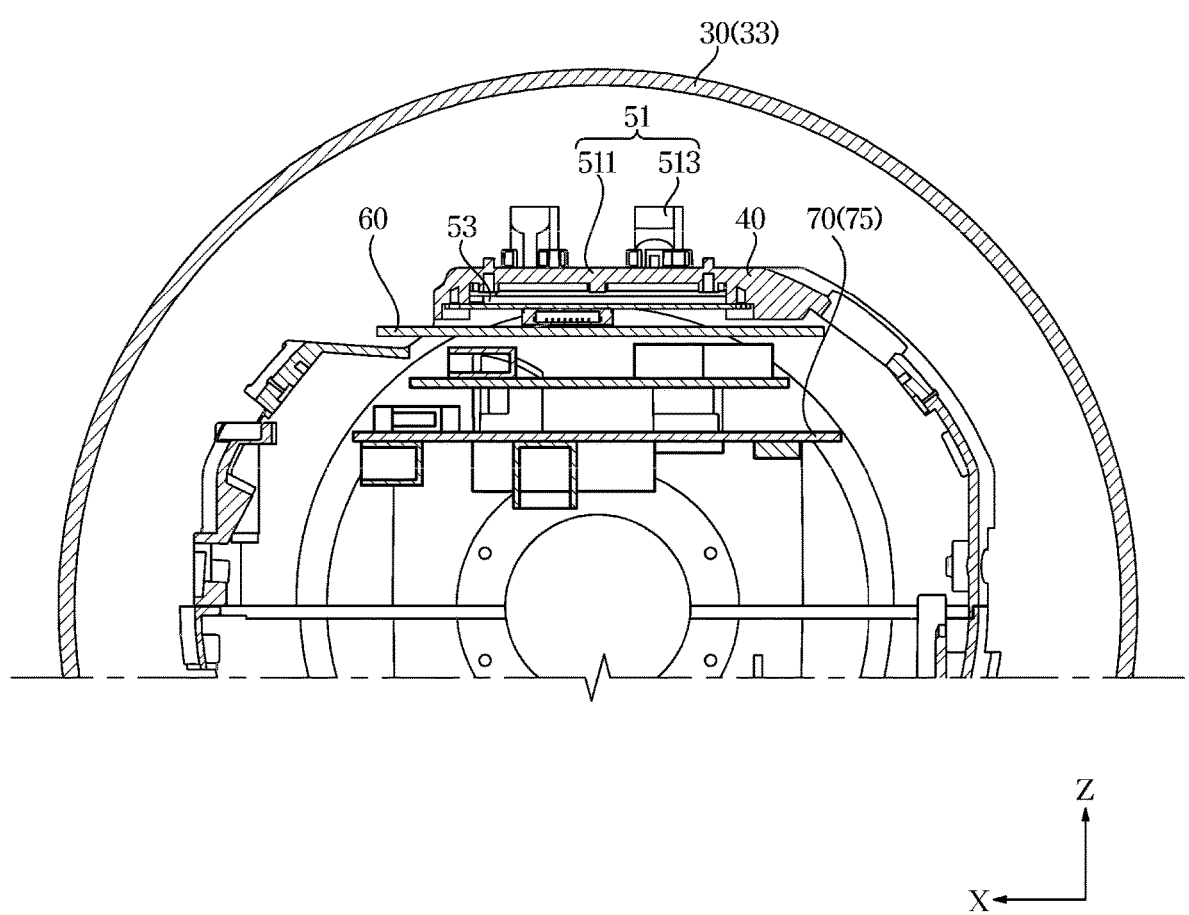
FIG. 4 is a side view of a moving robot, according to an embodiment.
Figure 5:
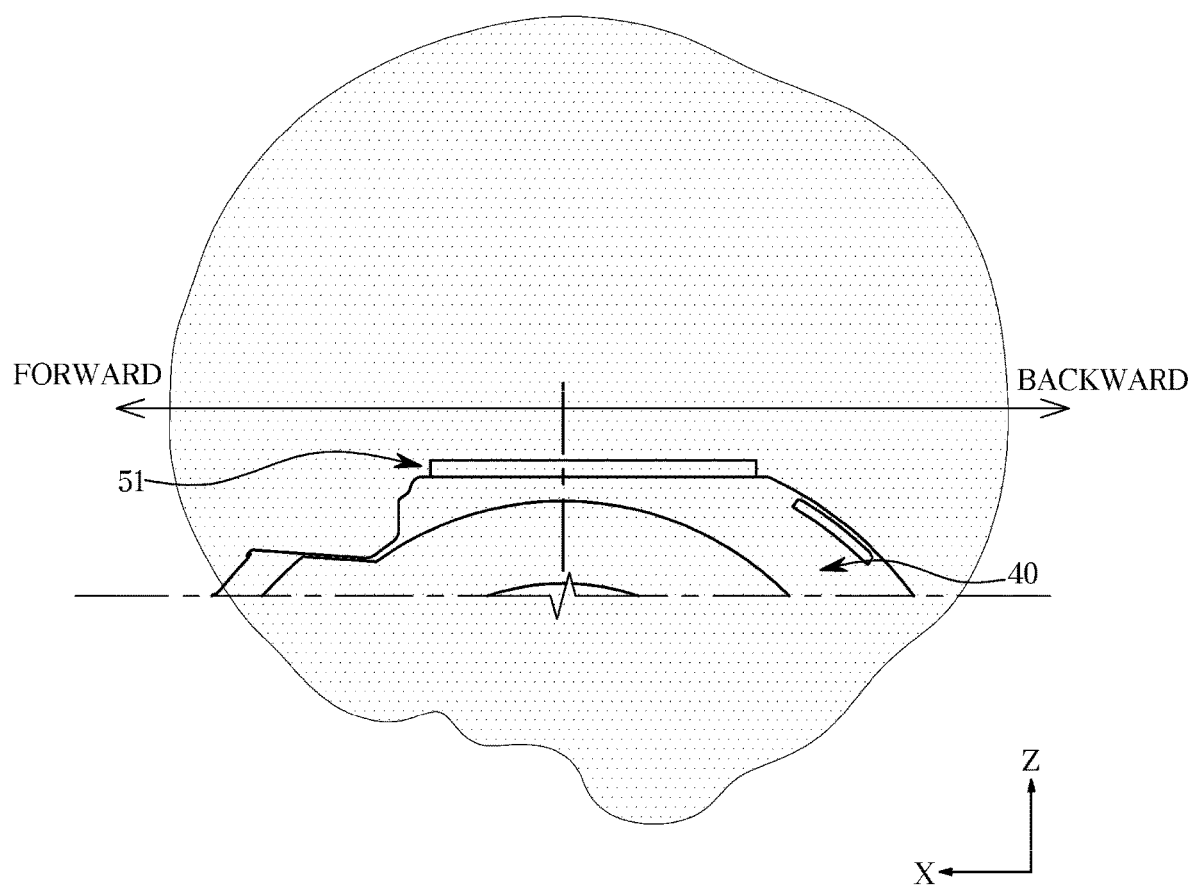
FIG. 5 illustrates a radio frequency emission pattern of an antenna module of a moving robot, according to an embodiment.

FIG. 2 is an exploded perspective view of the moving robot 1, according to an embodiment, FIG. 3 is a schematic side view of the moving robot 1 for describing a position of an antenna module, according to an embodiment, FIG. 4 is a side view of the moving robot 1, according to an embodiment, and FIG. 5 illustrates a radio frequency (RF) emission pattern of an antenna module of the moving robot 1, according to an embodiment.

Referring to FIG. 2, the moving robot 1 in an embodiment may include an inner case 40 that forms an inner space of the main body 10.

The outer case 30 may form the exterior of the main body 10 by enclosing the inner case 40, and in the inner space formed by the inner case 40, the moving module 20 for moving the main body 10 and a main board 70 on which at least one processor 75 for controlling the moving robot 1 is arranged may be included.

In an embodiment, the moving module 20 (also referred to as moving assembly 20) may include a motor 23, a gear 25, a battery 27, an actuator (not shown), a bearing (not shown), the wheels 21, etc. The moving module 20 may control the motor 23 to deliver rotation force to the wheels 21 under the control of the at least one processor 75, and accordingly, the moving robot 1 is able to move around.

In an embodiment, the at least one processor 75 may control general operation of the moving robot 1. For this, the at least one processor 75 may include one or more of a central processing unit (CPU), an application processor (AP), or a communication processor (CP). Furthermore, the at least one processor 75 may be a micro controller unit (MCU).

The at least one processor 75 may operate an operating system or an application program to control hardware or software components connected to the processor and perform various data processes and operations. Moreover, the at least one processor 75 may load a command or data received from at least one of the other components to a volatile memory and process the command or data, and store various types of data in a non-volatile memory.

In an embodiment, the moving robot 1 may include a communication device 50 for performing wireless communication with an external device.

The communication device 50 may include an antenna module 51 that may transmit or receive RF signals, and an ultra-wideband communication module 53 for generating and processing RF signals.

With this, the communication device 50 may perform UWB communication with an external device, and the at least one processor 75 may control the moving module 20 for the main body 10 to move toward the external device, based on a signal received from the external device through the communication device 50. This will be described in detail later.

The antenna module 51 may be arranged in an uppermost portion within the main body 10 as shown in FIGS. 2 to 4. That is, the antenna module 51 may be located in the highest level among the parts included in the main body 10. In other words, the antenna module 51 may be located in the highest position from a moving surface (bottom surface) of the moving robot 1 in a vertical axis (the Z axis). Hence, the at least one processor 75, the UWB communication module 53 and the moving module 20 may be located below the antenna module 51.

Specifically, the antenna module 51 may be located above the inner case 420 and arranged between the inner case 40 and the outer case 30 (upper case 33).

In this case, the UWB communication module 53 may be located within the inner case 40 and arranged below the antenna module 52, and may be connected to the antenna module 52 by a connector 55.

The communication device 50 may include the connector 55 arranged between the antenna module 52 and the UWB communication module 53 to electrically connect between the antenna module 52 and the UWB communication module 53. The connector 55 may correspond to an RF cable capable of delivering RF signals and may be arranged below the antenna module 52.

In this way, by being arranged in an uppermost portion within the main body 10, the antenna module 51 may be separated from outside of the main body 10 only by the outer case 30 with respect to a plane (an XY plane) orthogonal to the vertical axis (the Z axis) of the main body 10.

Accordingly, the antenna module 51 may emit RF signals without being subject to radio wave distortion and interference from other parts or structures not only in the moving direction (forward direction) but also in all directions, as shown in FIG. 5. Consequently, the antenna module 51 may minimize an error in RF signal reception from all directions, and the moving robot 1 may minimize errors in measuring a distance to and an angle with an external device regardless of the location of the external device.

The antenna module 51 (also referred to as antenna assembly) may include a substrate 511 and a plurality of antennas 513 arranged on the upper surface of the substrate 511.

In an embodiment, the substrate 511 may be provided as a plane (an xy plane) orthogonal to the vertical axis (the z axis) of the main body 10, allowing the plurality of antennas 513 to emit RF signals to planes parallel with the moving plane of the moving robot 1 so as to form an emission pattern with the same gain for all directions to which the moving robot 1 may move around.

In an embodiment, the plurality of antennas 513 may be provided as isotropic antennas. The moving robot 1 may have an all-directional, i.e., 360-degree emission pattern through an array of the plurality of antennas 513.

In this case, the array of the plurality of antennas 513 may be arranged in the middle of a cross-section (the xy plane) of the moving robot 1 in an embodiment. Specifically, the array of the plurality of antennas 513 is located in the uppermost portion in the man body 10 and also arranged in the middle of the cross-section, to create an emission pattern having isotropic omni-directional characteristics in all directions. The array of the plurality of antennas 513 will be described in detail later.

In an embodiment, a moving robot 1 may include a metal plate 60 located below the UWB communication module 53 to divide the inner space of the main body 10 formed by the inner case 40 so that the communication device 50 and the at least one processor 75 are spatially separated, and to block passage of RF signals.

That is, the metal plate 60 may be formed of a metal that acts as a shielding film against RF signals, and may divide the inner space of the main body 10.

In other words, the communication device 50 may be arranged on the metal plate 60, and the moving module 20 and the at least one processor 75 may be arranged under the metal plate 60.

This may spatially separate the communication device 50 from the other parts such as the at least one processor 75, the moving module 20, etc. Accordingly, interference with electromagnetic waves that may be generated by the communication device 50 from the other parts may be minimized.

It has thus far been described that the antenna module 51 is arranged in an uppermost portion within the main body 10 to form an emission pattern with a constant gain in all directions and accordingly, signals from all directions may be received without an error.

An embodiment in which an RF absorber is arranged between the antenna module 51 and the UWB communication module 53 will now be described in detail.

Figure 6:
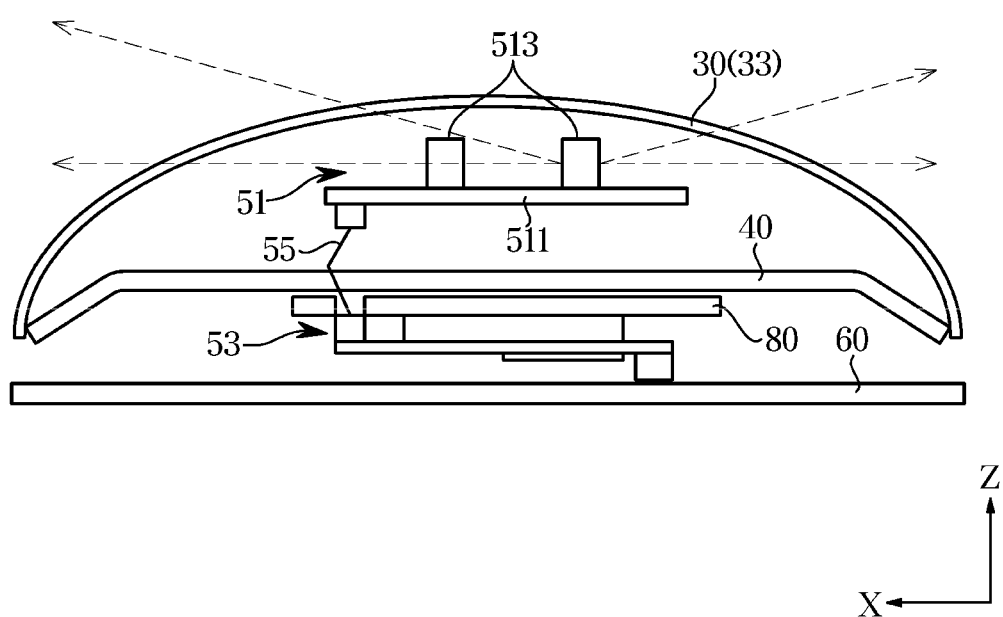
FIG. 6 is a diagram for describing an occasion when a moving robot further includes an RF absorber, according to an embodiment.
Figure 7:
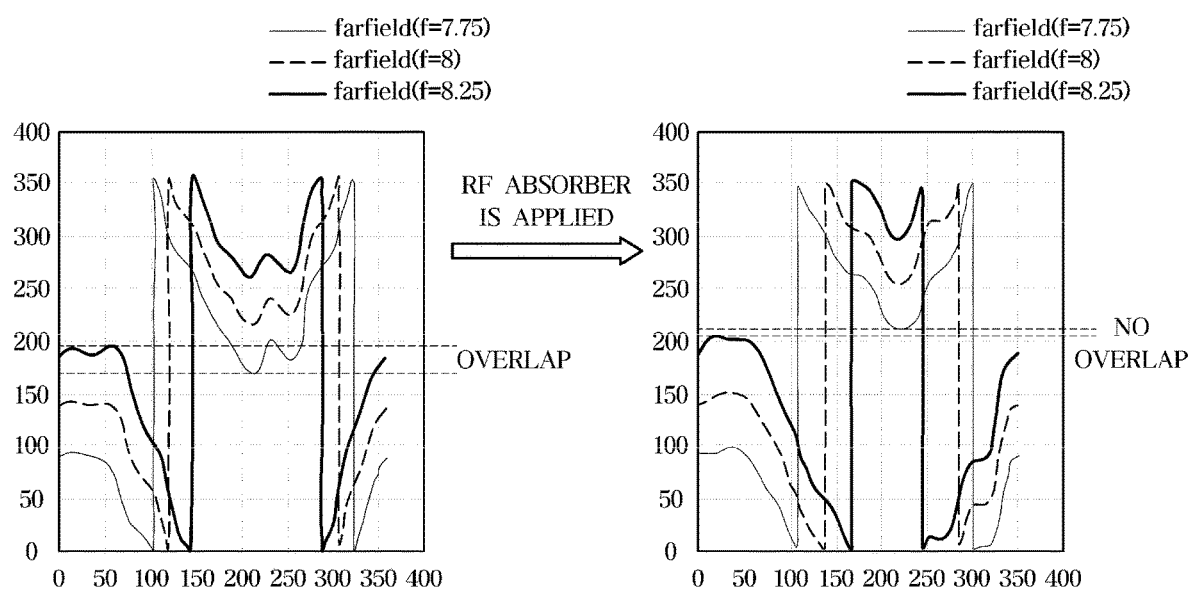
FIG. 7 is a diagram for describing changes in phase at an antenna depending on whether an RF absorber is applied, according to an embodiment.
Figure 8:
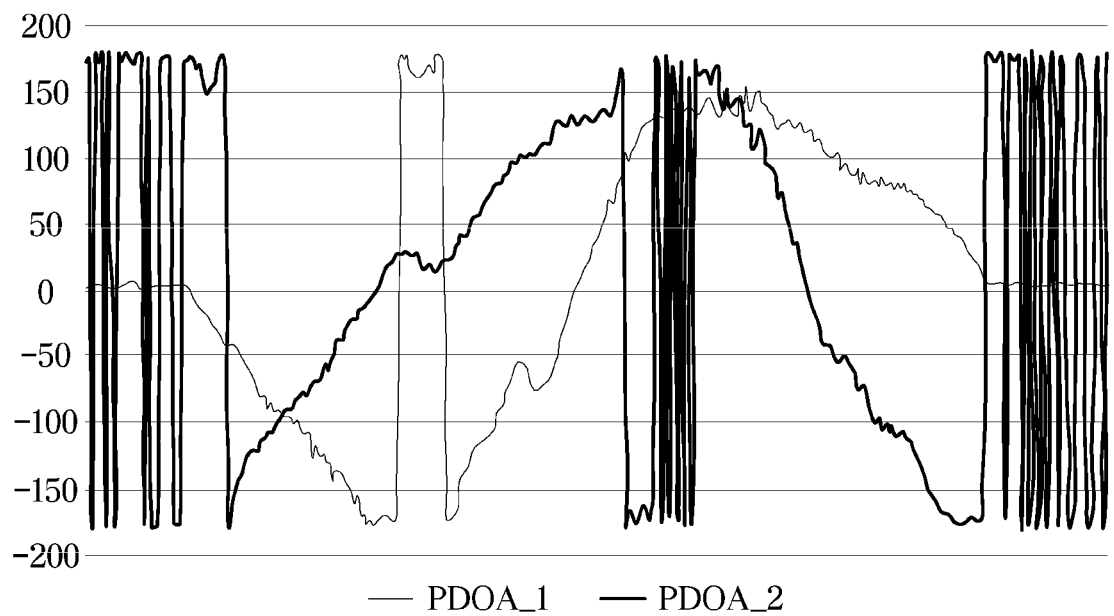
FIG. 8 is a diagram for describing changes in phase between antennas depending on whether an RF absorber is applied, according to an embodiment.
Figure 8:
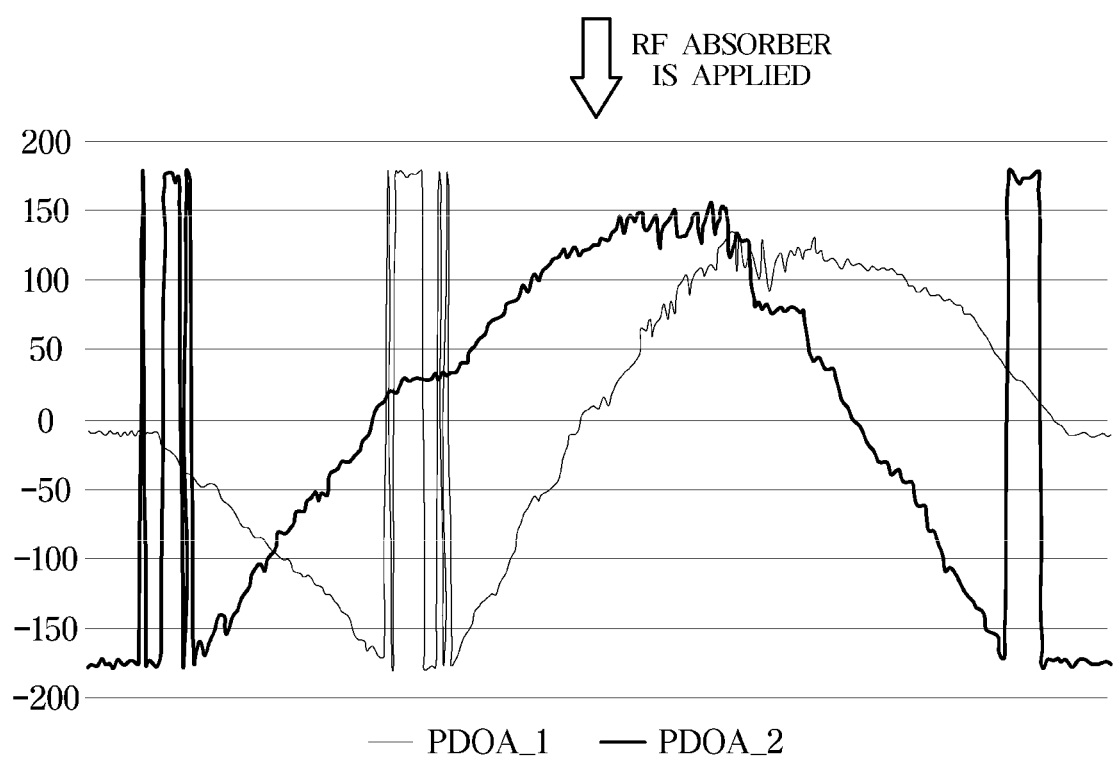

FIG. 6 is a diagram for describing an occasion when the moving robot 1 further includes an RF absorber, according to an embodiment, FIG. 7 is a diagram for describing changes in phase at the antenna 513 depending on whether an RF absorber is applied, according to an embodiment, and FIG. 8 is a diagram for describing changes in phase between the antennas 513 depending on whether an RF absorber is applied, according to an embodiment.

Referring to FIG. 6, the moving robot 1 according to an embodiment may further include an RF absorber 80 between the antenna module 51 and the UWB communication module 53.

The RF absorber 80 may absorb RF signals emitted from the antenna 513, preventing the RF signals emitted from the antenna 513 from being reflected by the UWB communication module 53 and emitted to the outside.

In this case, the RF absorber 80 may be made of an RF absorption material of a type known to the public, and may be formed to have an area wider than the substrate 511 of the antenna module 51 as shown in FIG. 6. This may efficiently prevent the RF signals emitted from the antenna 513 from being reflected from the UWB communication module 53.

Furthermore, as shown in FIG. 6, the RF absorber 80 may be arranged within the inner case 40 and arranged on the UWB communication module 53 within the inner case 40, preventing RF signals emitted from the antenna 513 from developing to the UWB communication module 53.

As described above, the RF absorber 80 may minimize phase changes that may occur when RF signals emitted from the antenna 513 are reflected by the UWB communication module 53, and eventually minimize an error in measuring an angle with an external device.

Specifically, RF signals received from the antenna 513 upon rotation of the moving robot 1 may undergo big changes in phase along with the rotation of the moving robot 1 when the RF absorber 80 is not applied, and there may be phase overlapping regions depending on the frequency despite differences in rotated positions of the moving robot 1, as represented in a graph on the left of FIG. 7.

On the other hand, when the RF absorber 80 is applied, the phase change from reflections on the UWB communication module 53 may be minimized, and the phase change along with the rotations of the moving robot 1 may be small and phase overlapping regions depending on the frequency may not be created, as represented in a graph on the right of FIG. 7.

As such, as the phase overlapping caused by rotation of the moving robot 1 may not occur by minimizing the phase change at one antenna 513, the phase difference between the antennas 513 may be determined linearly as well.

Specifically, as shown in FIG. 8, when the RF absorber 80 is applied, the phase difference (phase difference of arrival (PDOA)) between the antennas 513 may appear linearly without an overlapping region in comparison with when the RF absorber 80 is applied. In this case, PDOA_1 may be a phase difference between a pair of antennas among the plurality of antennas 513, and PDOA_2 may be a phase difference between another pair of antennas among the plurality of antennas 513.

Specifically, to search for a fixed location of an external device, the moving robot 1 that receives an RF signal transmitted from the external device may receive the RF signal at various angels while being rotated, and determine the location of the external device by determining a phase difference between the plurality of antennas 513.

In this case, when there is a phase difference overlapping region created depending on the rotational position of the moving robot 1, it may be difficult to measure an accurate location of the external device and thus, linear changes in phase difference are required along with the rotation of the moving robot 1.

As such, when the RF absorber 80 is arranged, phase changes of RF signals from reflections on the UWB communication module 53 may be minimized, allowing the phase difference between the antennas 513 to be changed linearly along with the rotation of the moving robot 1.

The embodiment of further including the RF absorber 80 has thus far been described in detail.

Arrays of the plurality of antennas 513 of the antenna module 51 will now be described in detail.

Figure 9:
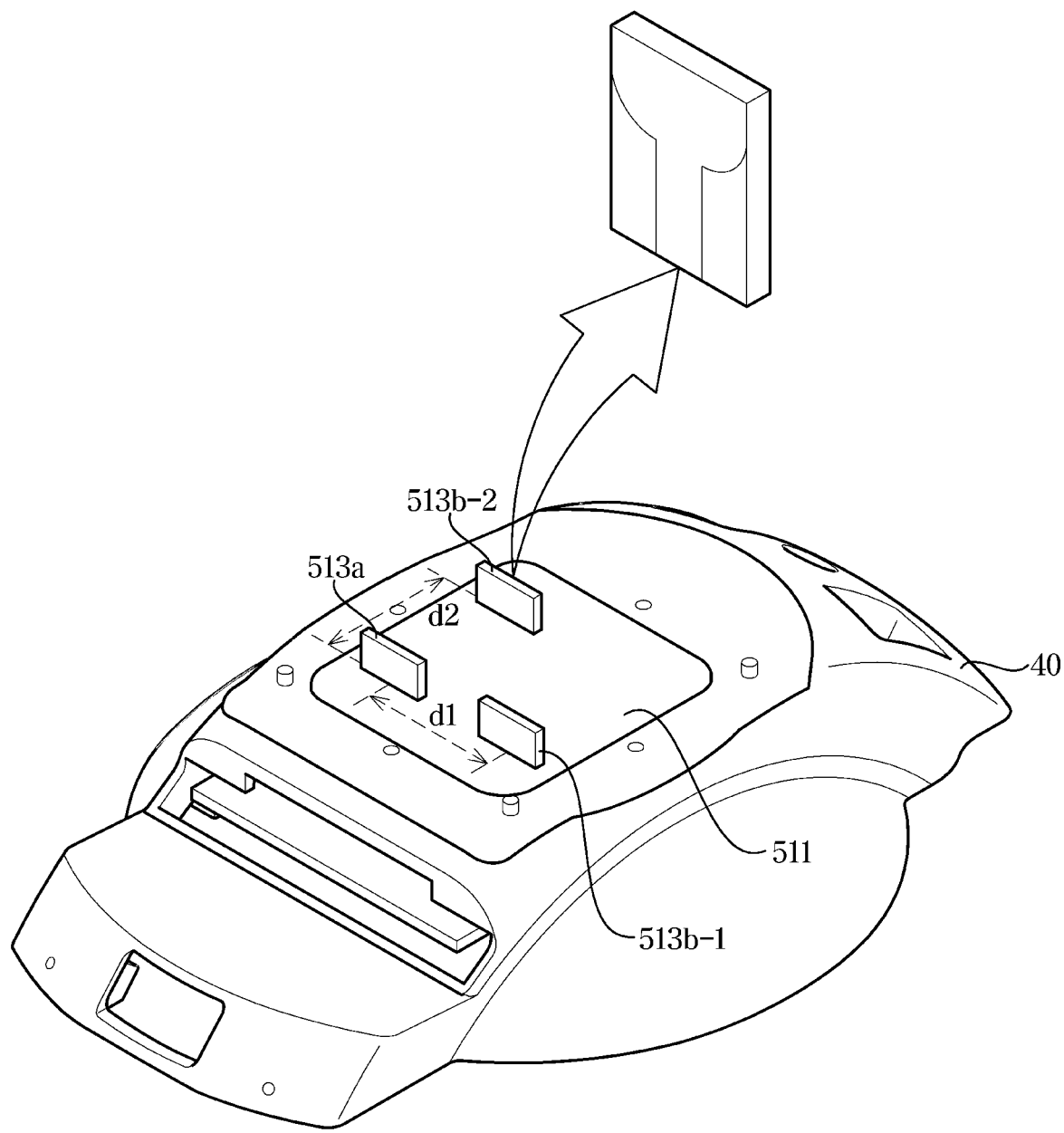
FIG. 9 illustrates an occasion when antennas are arranged vertically on a substrate, according to an embodiment.
Figure 10:
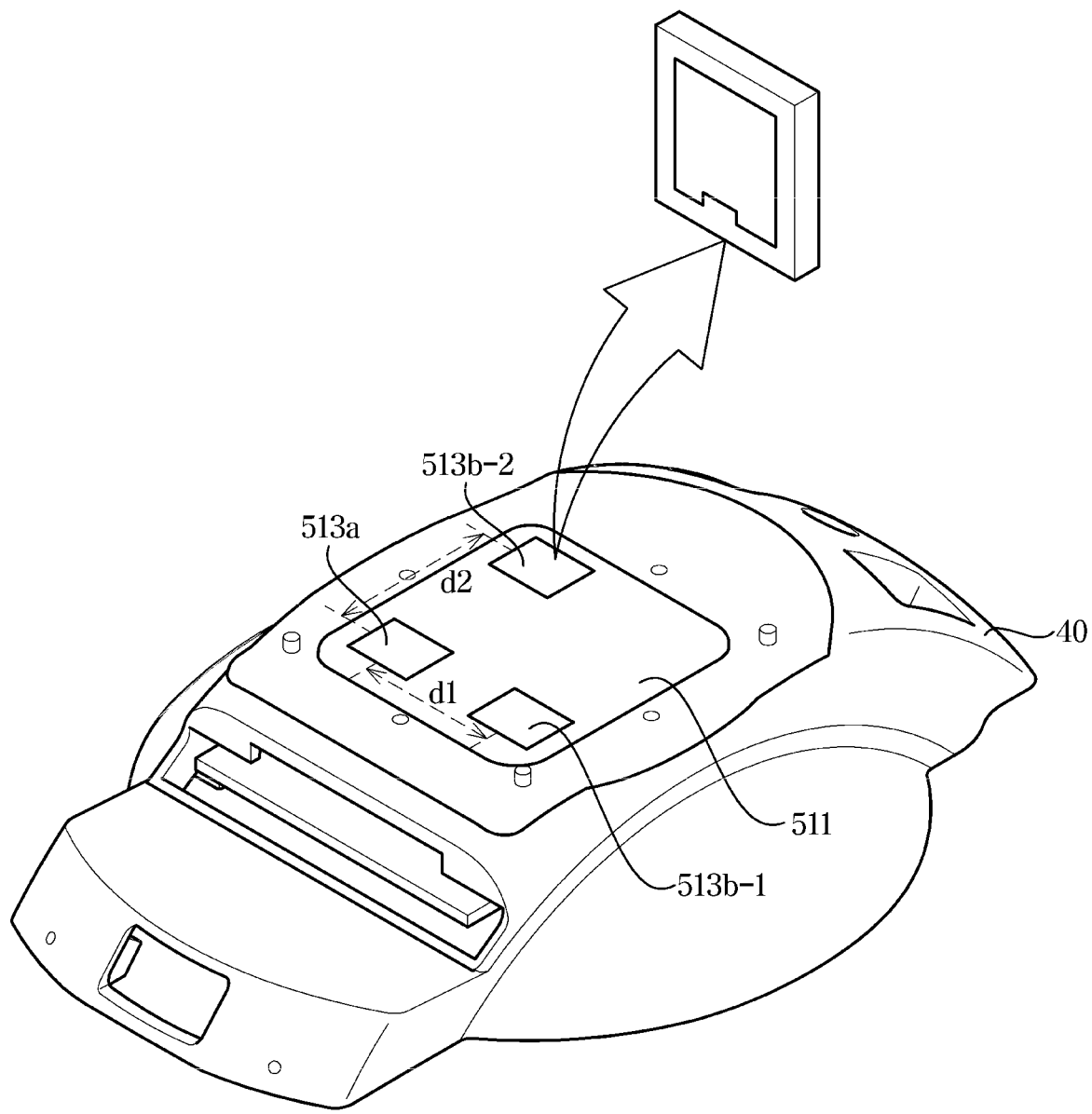
FIG. 10 illustrates an occasion when antennas are arranged horizontally on a substrate, according to an embodiment.

FIG. 9 illustrates an occasion when the antennas 513 are arranged vertically on the substrate 511, according to an embodiment, and FIG. 10 illustrates an occasion when the antennas 513 are arranged horizontally on the substrate 511, according to an embodiment.

Referring to FIGS. 9 and 10, in an embodiment, the antenna module 51 may include the substrate 511 and the plurality of antennas 513 arranged on the upper surface of the substrate 511.

In an embodiment, the plurality of antennas 513 may include a first antenna 513*a* and a plurality of second antennas 513*b* arranged at the same distance from the first antenna 513*a*.

In an embodiment, the first antenna 513*a* may correspond to transmit/receive combination antenna for transmitting and receiving RF signals and the second antennas 513*b* may be an antenna dedicated to reception that may only receive RF signals. However, the first antenna 513*a* and the second antenna 513*b* may have other various antenna types in other embodiments.

In the following description, it will be assumed that there are, for example, two second antennas 513*b* arranged, for convenience of explanation. The number of the second antennas 513*b* is not, however, limited thereto, and other various number of second antennas 513*b* may be provided in some other embodiments.

In an embodiment, the plurality of antennas 513 may be vertically attached to the substrate 511 located on top of the inner case 40, as shown in FIG. 9. In this case, the plurality of antennas 513 may be formed in a mono pole patch antenna type. The type of the plurality of antennas 513 is not limited thereto, and has no limitations as long as the type may create an isotropic emission pattern even when the plurality of antennas 513 are vertically attached to the substrate 511.

Furthermore, in an embodiment, the plurality of antennas 513 may be horizontally attached to the substrate 511 located on top of the inner case 40, as shown in FIG. 10. In this case, the plurality of antennas 513 may be formed in a patch antenna type. The type of the plurality of antennas 513 is not limited thereto, and has no limitations as long as the type may create an isotropic emission pattern even when the plurality of antennas 513 are horizontally attached to the substrate 511.

As described above, the plurality of second antennas 513*b* may be arranged at the same distance from the first antenna 513*a*.

For example, as shown in FIGS. 9 and 10, a distance d1 between the first antenna 513*a* and one 513*b*-1 of the plurality of second antennas 513*b* may be equal to a distance d2 between the first antenna 513*a* and the other 513*b*-2 of the plurality of second antennas 513*b*.

As such, the plurality of second antennas 513*b* are arranged at the same distance from the first antenna 513*a*, so that the moving robot 1 may accurately calculate an angle with an external device in any direction. Calculation about an angle with an external device will be described in detail later.

In this case, the distances d1 and d2 between antennas may be a half of a wavelength corresponding to a highest frequency for UWB communication (e.g., 18 mm to 20 mm) in an embodiment. This may enable the moving robot 1 to calculate an accurate angle with an external device in any direction.

An optimal array of the plurality of antennas 513 will now be described.

Figure 11:
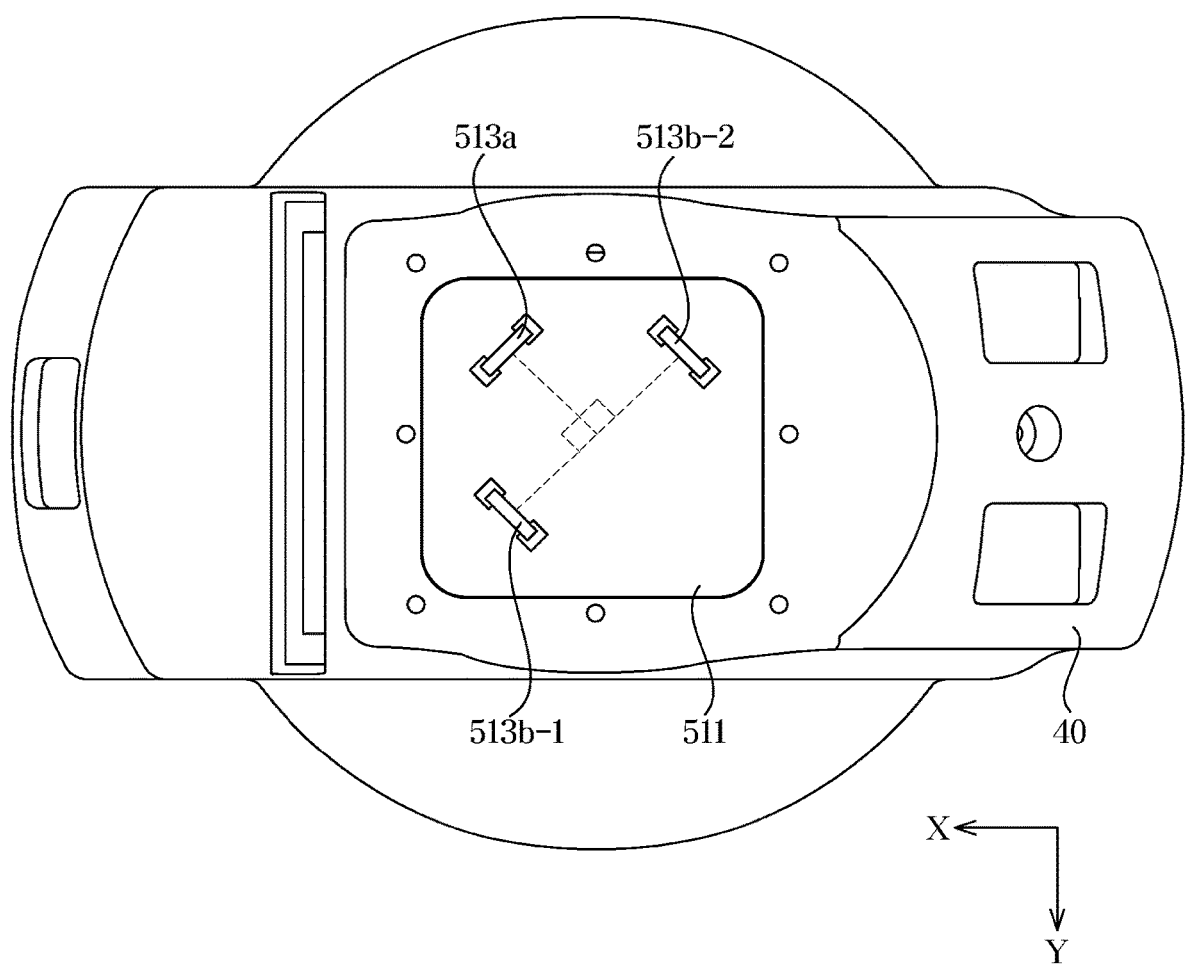
FIG. 11 illustrates an optimal array of antennas arranged vertically on a substrate, according to an embodiment.
Figure 12:
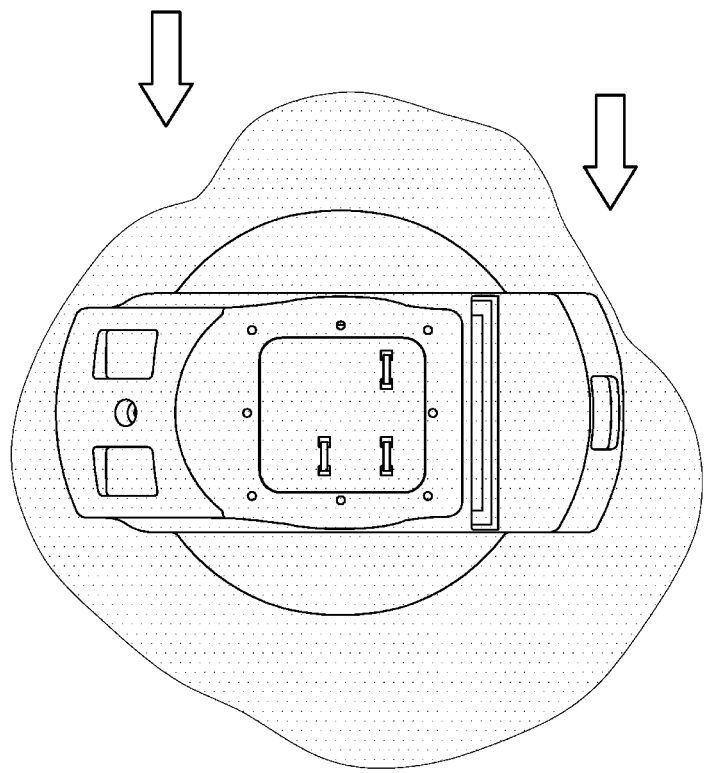
FIG. 12 illustrates RF signal emission patterns depending on antenna arrangement when antennas are arranged vertically on a substrate, according to an embodiment.
Figure 12:
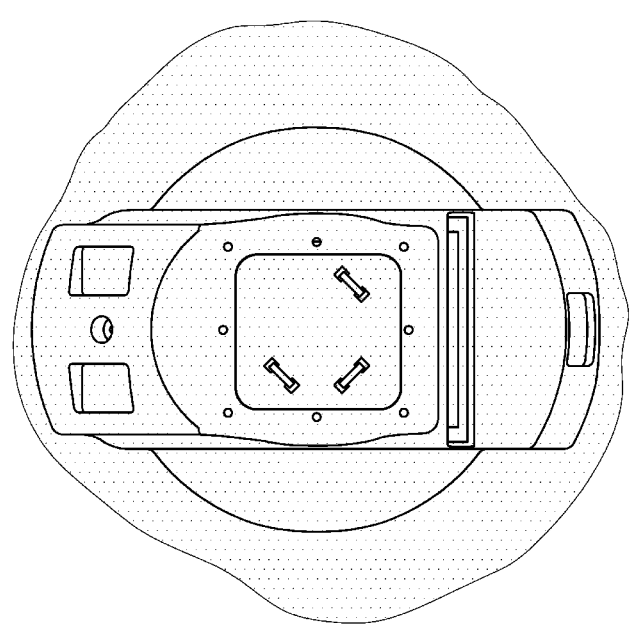
Figure 12:
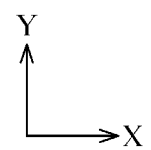
Figure 13:
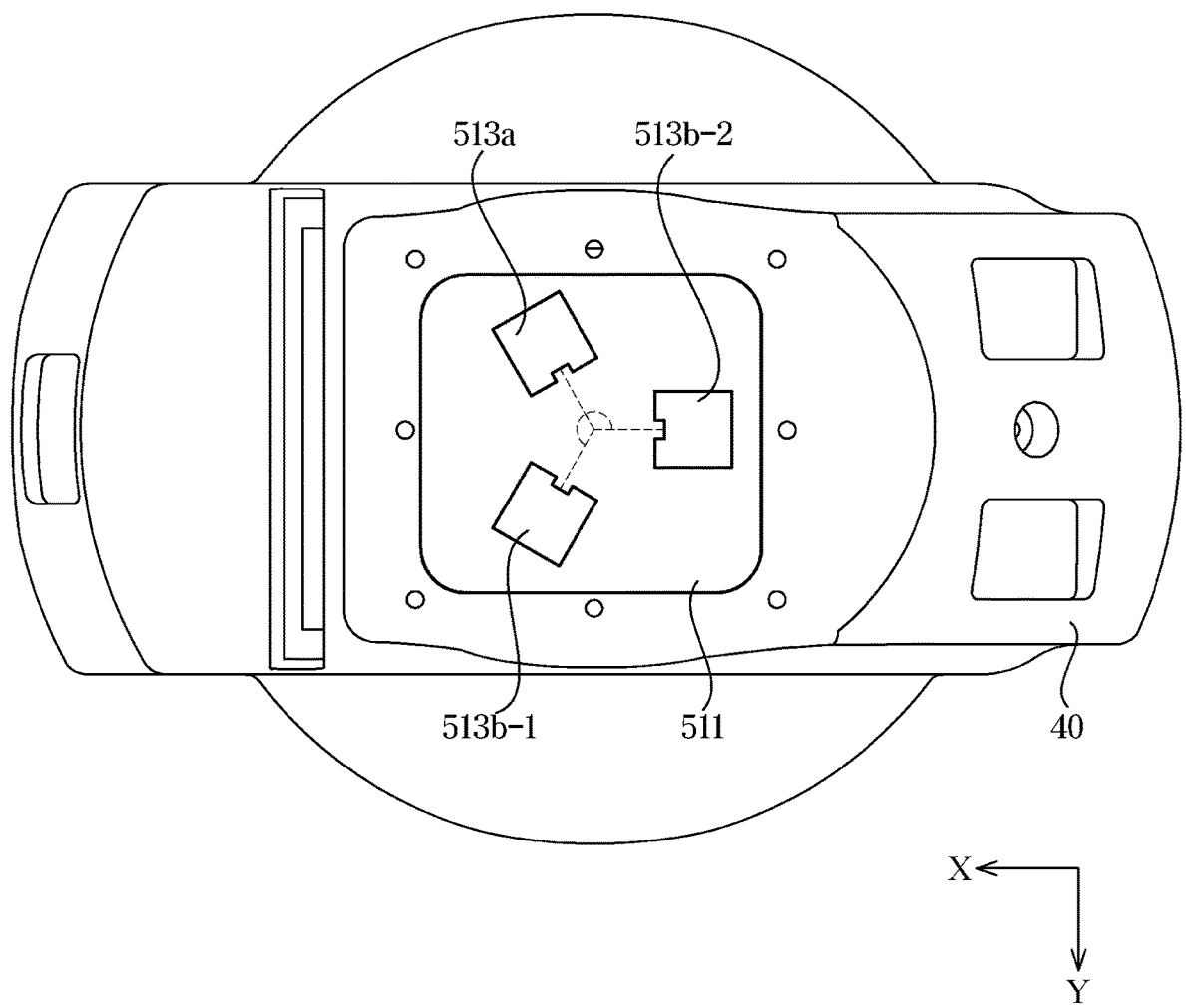
FIG. 13 illustrates an optimal array of antennas arranged horizontally on a substrate, according to an embodiment.
Figure 14:
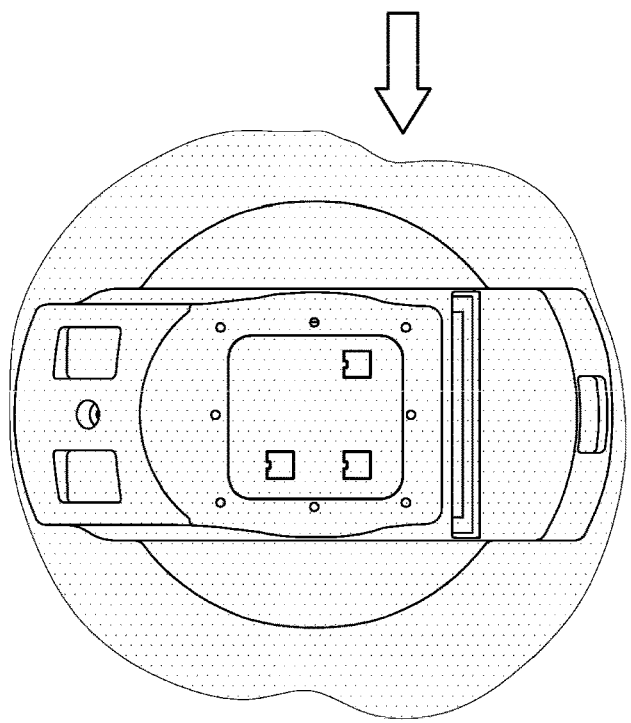
FIG. 14 illustrates RF signal emission patterns depending on antenna arrangements when antennas are arranged horizontally on a substrate, according to an embodiment.
Figure 14:
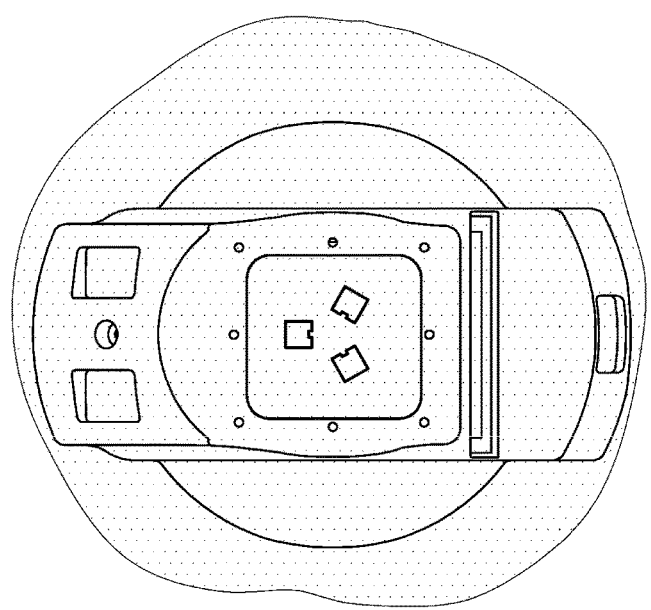
Figure 14:
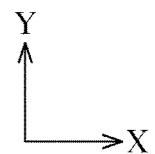

FIG. 11 illustrates an optimal array of the antennas 513 arranged vertically on the substrate 511, according to an embodiment, FIG. 12 illustrates an emission pattern of RF signals from an array of antennas 513 arranged vertically on the substrate 511, according to an embodiment, FIG. 13 illustrates an optimal array of the antennas 513 arranged horizontally on the substrate 511, according to an embodiment, and FIG. 14 illustrates an emission pattern of RF signals from an array of antennas 513 arranged horizontally on the substrate 511, according to an embodiment.

In an embodiment, the plurality of second antennas 513*b* may be arranged so that the center axis forms a preset angle with a center axis of the first antenna 513*a*. Specifically, the second antenna 513*b* is arranged by being rotated from the first antenna 513*a* at a preset angle so that energy emitted from the first antenna 513*a* is coupled with the second antenna 513*b* and then emitted, thereby minimizing interference between the plurality of antennas 513.

As such, in the moving robot 1, the plurality of antennas 513 are arranged to form a preset angle with each other, minimizing interference between the antennas 513, which leads to solving a problem of emission gain degradation at a particular angle, thereby providing uniform emission gains in all directions.

For example, as shown in FIG. 11, when the plurality of antennas 513 are arranged vertically on the substrate 511, the center axis of each of the plurality of second antennas 513*b* may form a preset angle (e.g., 90 degrees) with the center axis of the first antenna 513*a*.

As shown in (a) of FIG. 12, when the center axes of the plurality of antennas 513 are parallel to each other, a problem of emission gain degradation at a particular angle may arise due to interference between the antennas 513 as in regions indicated by arrows in (a) of FIG. 12.

On the contrary, as shown in (b) of FIG. 12, when the center axis of each of the plurality of second antennas 513*b* forms a preset angle with the center axis of the first antenna 513*a*, energy emitted from the first antenna 513*a* may be coupled with the second antenna 513*b* and then emitted, thereby minimizing interference between the plurality of antennas 513. This may solve the problem of emission gain degradation at a particular angle, and thus provide uniform emission gains in all directions.

Furthermore, as shown in FIG. 13, when the plurality of antennas 513 are arranged horizontally on the substrate 511, the center axis of each of the plurality of second antennas 513*b* may form a preset angle (e.g., 120 degrees) with the center axis of the first antenna 513*a*.

As shown in (a) of FIG. 14, when the center axes of the plurality of antennas 513 are parallel to each other, a problem of emission gain degradation at a particular angle may arise due to interference between the antennas 513 as in regions indicated by arrows in (a) of FIG. 12.

On the contrary, as shown in (b) of FIG. 14, when the center axis of each of the plurality of second antennas 513b forms a preset angle with the center axis of the first antenna 513a, energy emitted from the first antenna 513a may be coupled with the second antenna 513b and then emitted, thereby minimizing interference between the plurality of antennas 513. This may solve the problem of emission gain degradation at a particular angle, and thus provide uniform emission gains in all directions.

Arrays of a plurality of antennas 513 have thus far been described in detail. How to determine a distance to and angle with an external device and control the moving module 20 to move toward the external device through the plurality of antennas 513 will now be described.

Figure 15:
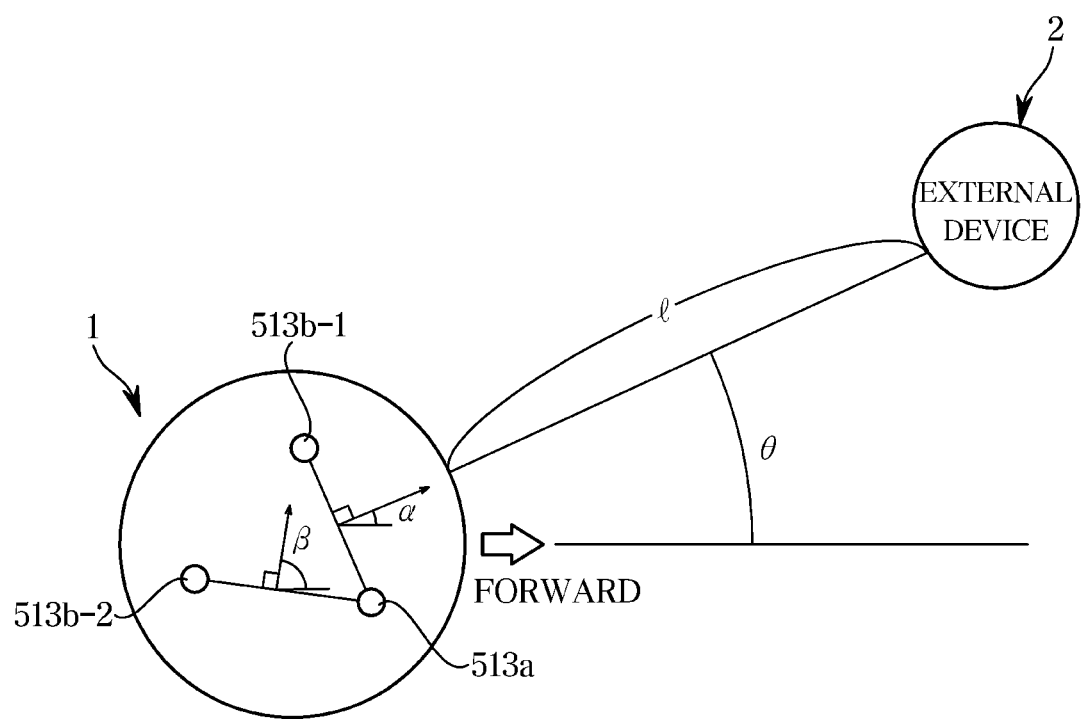
FIG. 15 is a diagram for describing an occasion when a moving robot determines a distance to and angle with an external device, according to an embodiment.

FIG. 15 is a diagram for describing an occasion when a moving robot 1 determines a distance to and angle with an external device, according to an embodiment.

Referring to FIG. 15, the at least one processor 75 in an embodiment may determine a distance L to an external device 2 based on a difference in time between when the external device 2 transmits a signal and when the first antenna 513a receives the signal transmitted from the external device 2.

In an embodiment, the at least one processor 75 may determine an angle θ with the external device 2 based on a difference in phase between a signal received through the first antenna 513a and signals received through the plurality of second antennas 513b and a location of an array of the first antenna 513a and the plurality of second antennas 513b.

Specifically, the at least one processor 75 may determine the angle θ with the external device 2 based on a difference in phase between a signal received through the first antenna 513a and a signal received through one 513b-1 of the plurality of second antennas 513b, a difference in phase between a signal received through the first antenna 513a and a signal received through the other of the plurality of second antennas 513b and a location of an array of the first antenna 513a and the plurality of second antennas 513b.

For this, the at least one processor 75 may determine a synthetic phase difference $\phi_s$ by applying a phase difference $\phi_1$ between a signal received through the first antenna 513a and a signal received through one 513b-1 of the plurality of second antennas 513b and a phase difference $\phi_2$ between a signal received through the first antenna 513a and a signal received through the other of the plurality of second antennas 513b to the following equation 1:

$$\phi_s = \frac{\left(\phi_2 - \phi_1 \frac{\sin\beta}{\sin\alpha}\right)}{\left(\frac{\sin\beta}{\sin\alpha} - con\beta\right)} \quad \langle\text{Equation 1}\rangle$$

where α denotes an angle between a normal vector to a parallel line between the first antenna 513a and one 513b-1 of the plurality of second antennas 513b and a vector toward the front of the moving robot 1. Furthermore, β denotes an angle between a normal vector to a parallel line between the first antenna 513a and the other 513b-2 of the plurality of second antennas 513b and the vector toward the front of the moving robot 1.

The at least one processor 75 may determine the angle θ with the external device 2 by applying the synthetic phase difference $\phi_s$ to the following equation 2:

$$\theta = \sin^{-1}\left(\frac{\lambda\phi_s}{360d}\right) \quad \langle\text{Equation 2}\rangle$$

where λ may correspond to a wavelength of RF signals received by the antenna 513 and d may correspond to a distance between the antennas 513.

Moreover, the at least one processor 75 may determine whether the angle θ with the external device 2 is formed with respect to a forward direction of the moving robot 1 or a backward direction of the moving root 1 based on the following equation 3:

$$FR = \frac{\left(\phi_2 - \phi_1 \frac{\cos\beta}{\cos\alpha}\right)}{(\sin\beta - \tan\alpha con\beta)} \quad \langle\text{Equation 3}\rangle$$

In this case, when FR is greater than 0, the at least one processor 75 may determine that the external device 2 is located ahead, so the angle θ with the external device 2 is formed with respect to the forward direction of the moving robot 1. Furthermore, when FR is smaller than 0, the at least one processor 75 may determine that the external device 2 is located behind, so the angle θ with the external device 2 is formed with respect to the backward direction of the moving robot 1.

After this, the at least one processor 75 may control the moving module 20 to move the main body 10 toward the external device 2 based on the distance to the external device 2 and the angle with the external device 2.

As such, the disclosure may create an emission pattern with uniform emission gains in all directions by arranging the antenna module 51 in an uppermost portion within the main body 10, and accordingly, receive RF signals transmitted by the external device 2 without an error no matter in which direction the external device 2 is. As a result, the disclosure may enable accurate measurement on a location of the external device 2 by receiving RF signals transmitted from the external device 2 without an error, thereby ensuring movement to the external device 2.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc. The embodiments of the disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A moving robot comprising:
a main body;
a moving assembly configured to move the main body;

a communication device configured to perform wireless communication with an external device, the communication device including:
  an antenna assembly arranged at an uppermost portion of an interior of the main body, and
  an ultra-wideband (UWB) communication module;
an outer case forming an exterior of the main body;
an inner case positioned at an interior of the outer case; and
at least one processor configured to control the moving assembly based on a signal received from the external device through the communication device so that the main body moves,
wherein the antenna assembly comprises:
  a substrate between the outer case and the inner case,
  a first antenna arranged on an upper surface of the substrate, and
  a plurality of second antennas arranged on the upper surface of the substrate, and each of the plurality of second antennas arranged at a same distance away from the first antenna, and
  the UWB communication module is arranged inside the inner case and under the antenna assembly.

2. The moving robot of claim 1, wherein the substrate is positioned along a plane orthogonal to a vertical axis of the main body.

3. The moving robot of claim 2, wherein the first antenna and the plurality of second antennas are positioned between the outer case and the substrate and separated from outside of the main body only by the outer case with respect to the plane orthogonal to the vertical axis of the main body.

4. The moving robot of claim 1, wherein the communication device comprises:
  a connector arranged between the antenna assembly and the UWB communication module, the connector electrically connecting the antenna assembly and the UWB communication module.

5. The moving robot of claim 4, wherein the moving robot further comprises:
  a radio frequency (RF) absorber configured to absorb RF signals, the radio frequency absorber arranged between the antenna assembly and the UWB communication module.

6. The moving robot of claim 5, wherein the RF absorber is arranged at the interior of the inner case.

7. The moving robot of claim 5, wherein the RF absorber is formed to have an area wider than the substrate of the antenna assembly.

8. The moving robot of claim 4, wherein the moving robot comprises:
  a metal plate located under the UWB communication module to divide an inner space of the main body formed by the inner case to spatially separate the communication module from the at least one processor, and block a passage of RF signals.

9. The moving robot of claim 8, wherein the moving assembly and the at least one processor are arranged under the metal plate.

10. The moving robot of claim 4, wherein a distance between the first antenna and the second antenna is equal to or less than a half of a wavelength corresponding to a highest frequency for UWB communication.

11. The moving robot of claim 1, wherein the first antenna and the plurality of second antennas are isotropic antennas.

12. The moving robot of claim 1, wherein an array of the first antenna and the plurality of second antennas are arranged in a middle of a cross-section of the moving robot.

13. The moving robot of claim 1, wherein the plurality of second antennas are arranged so that a center axis thereof form a preset angle with a center axis of the first antenna.

14. The moving robot of claim 1, wherein the first antenna and the plurality of second antennas are attached to the substrate along a horizontal axis or a vertical axis.

* * * * *